W. F. MUEHL.
WHEEL.
APPLICATION FILED JULY 8, 1921.
1,427,492.
Patented Aug. 29, 1922.
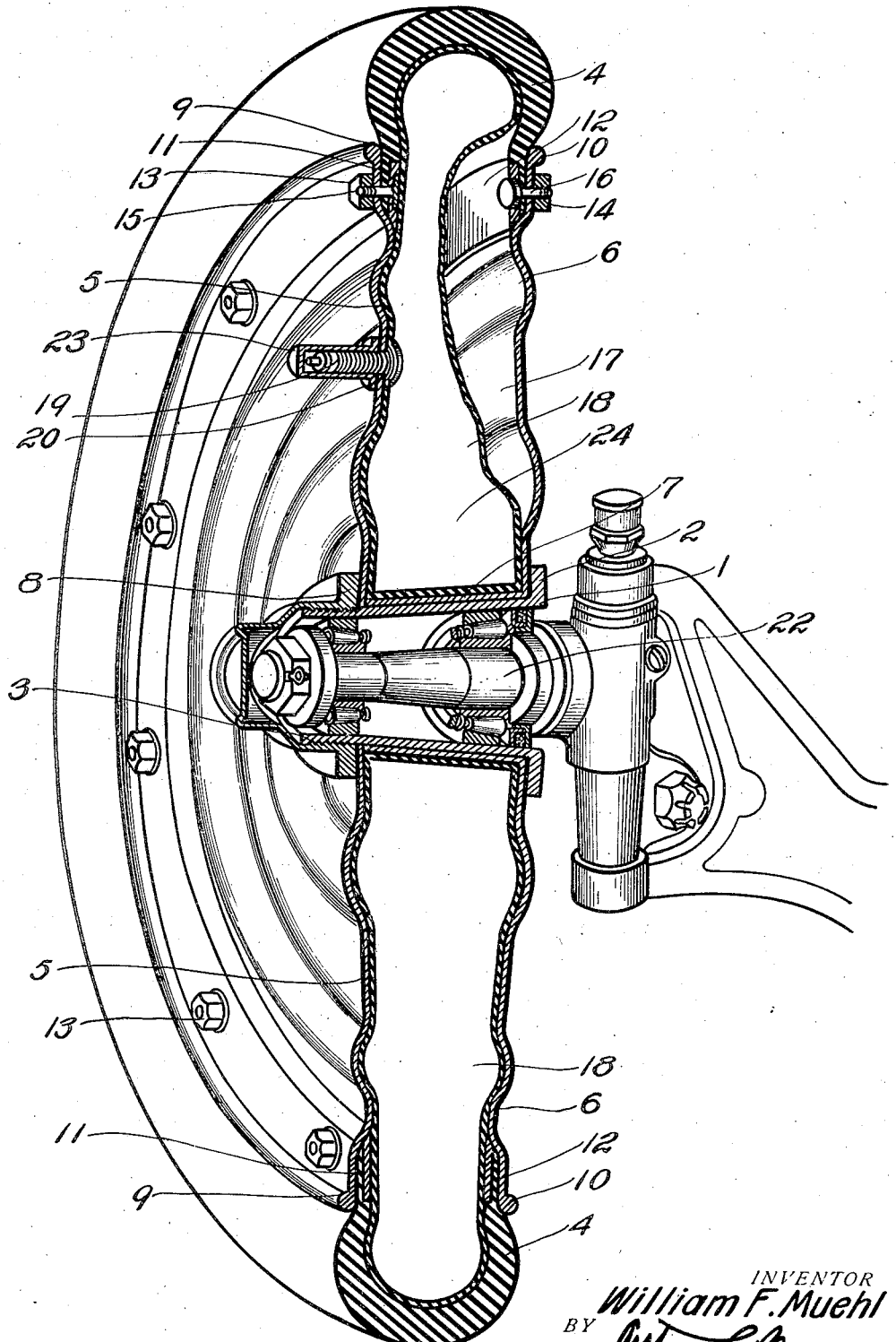
INVENTOR
William F. Muehl
BY
ATTORNEY

UNITED STATES PATENT OFFICE.

WILLIAM F. MUEHL, OF KANSAS CITY, MISSOURI.

WHEEL.

1,427,492. Specification of Letters Patent. Patented Aug. 29, 1922.

Application filed July 8, 1921. Serial No. 483,161.

*To all whom it may concern:*

Be it known that I, WILLIAM F. MUEHL, a citizen of the United States, residing at Kansas City, in the county of Jackson and State of Missouri, have invented certain new and useful Improvements in Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to vehicle wheels and one of the objects thereof is to provide a novel form of wheel wherein the maximum amount of resiliency will be provided between the hub and the shoe.

This is accomplished by providing a relatively large air cushion by constructing the wheel in such manner that the inner tube or air-containing envelope will have a relatively large cross sectional area to permit an amount of air to be introduced greatly in excess of that which is possible with the ordinary inner tube of the so-called pneumatic type now generally employed.

The novel construction of the wheel will be apparent by reference to the following description in connection with the accompanying drawings, in which The figure is a fragmentary perspective view of a wheel constructed in accordance with my invention, the walls and hub being shown in section.

The wheel is shown as consisting of a hub 1 having an out-turned flange 2 at one end and a threaded portion 3 at the other. The periphery of the wheel consists of a shoe 4, which is preferably of rubber generically conforming to the shoe of an ordinary pneumatic tire. It is connected at its respective edges, however, to two spaced webs 5 and 6, which are shown as provided with circular corrugations.

The web 6 has a right angularly projecting sleeve portion 7, to fit over the hub 2 and the width of the sleeve 7 is equal to the distance between the two webs 5 and 6, the web portion 5 lying against the free edge of the flange or sleeve 7 and clamped thereto by the jam nut 8. The outer edges or perimeters of the webs 5 and 6 are provided with beads 9 and 10, which bear against the shoe 4, the beads preventing cutting of the shoe 4 when in use.

The shoe 4 is fastened to the respective edges by any suitable means. In the present instance I have shown clamping rings 11 and 12, which bear against the inner walls of the respective edge portions of the shoe 4 and clamp them against the webs 5 and 6, the clamps being drawn toward the webs 5 and 6 by the nuts 13 and 14 on the bolts 15 and 16, which extend through the clamping rings and through the webs 5 and 6. The bolts 15 and 16 may be integral with the rings 11 and 12 if desired; in which event they will constitute studs with threaded ends to receive the nuts 13 and 14.

Within the space 17 formed by the side walls or webs 5 and 6 and the sleeve 7 and shoe 4 is an inner tube or air bag 18, which completely fills the entire space 17 and said air bag or inner tube is provided with a valve stem 19, which projects through an opening 20 in the web 5 so that the air can be pumped into the air bag or inner tube after the manner of a pneumatic tire to inflate the same and provide the requisite pressure for the shoe 4.

The hub may be supported upon an axle 22 in any appropriate manner and the axle may be of any form desired so it is not deemed necessary to specifically describe the axle in this application.

When the parts are assembled as shown in the drawings and it is desired to inflate the inner tube or bag 18, the valve stem cap 23 will be removed and the inflation can be accomplished through an air pipe or air pump in the usual way.

The air cushion, provided by the air in the inflated space 24, will afford the necessary resiliency for the wheel, the shocks and jars being communicated to and dissipated by the air within the envelope or air bag 18 in a much more efficient manner than would be possible with the ordinary pneumatic tire.

Since the bag or inner tube 18 will lie against the walls of the webs 5 and 6 as well as against the shoe 4, it will be apparent that the compressed air will absorb a considerable portion of the shocks before they can be communicated to the load on the vehicle.

When it is desired to remove the bag or inner tube the jam nut 8 may be removed and the web 5 can then be slid off the hub 1 and if the nuts 13 are removed from the bolts 15, the entire web can be taken off so that the bag or inner tube 18 can be removed.

In assembling the parts, the web 6 with its sleeve will be sleeved upon the hub 1 so that the web 6 will rest against the flange 2. The inner tube may be put in place and then the shoe 4 may be secured to the web. After which the web 5 may be put in place and the jam nut 8 screwed onto the threaded portion 3 of the hub. Then if the inner tube or air bag is inflated at the desired pressure, the wheel will be ready for use.

What I claim and desire to secure by Letters-Patent is:

A wheel comprising a hub, a shoe having spaced inner edges, webs connecting the hub to the spaced inner edges of the shoe, the webs having circular corrugations concentric with the hub, and an inflatable tube within the space confined by the hub, the webs and the shoe.

In testimony whereof I affix my signature.

WILLIAM F. MUEHL.